Nov. 9, 1948.   L. D. STATHAM   2,453,551
RING TYPE RESISTANCE STRAIN GAUGE DYNAMOMETER
Filed July 31, 1947
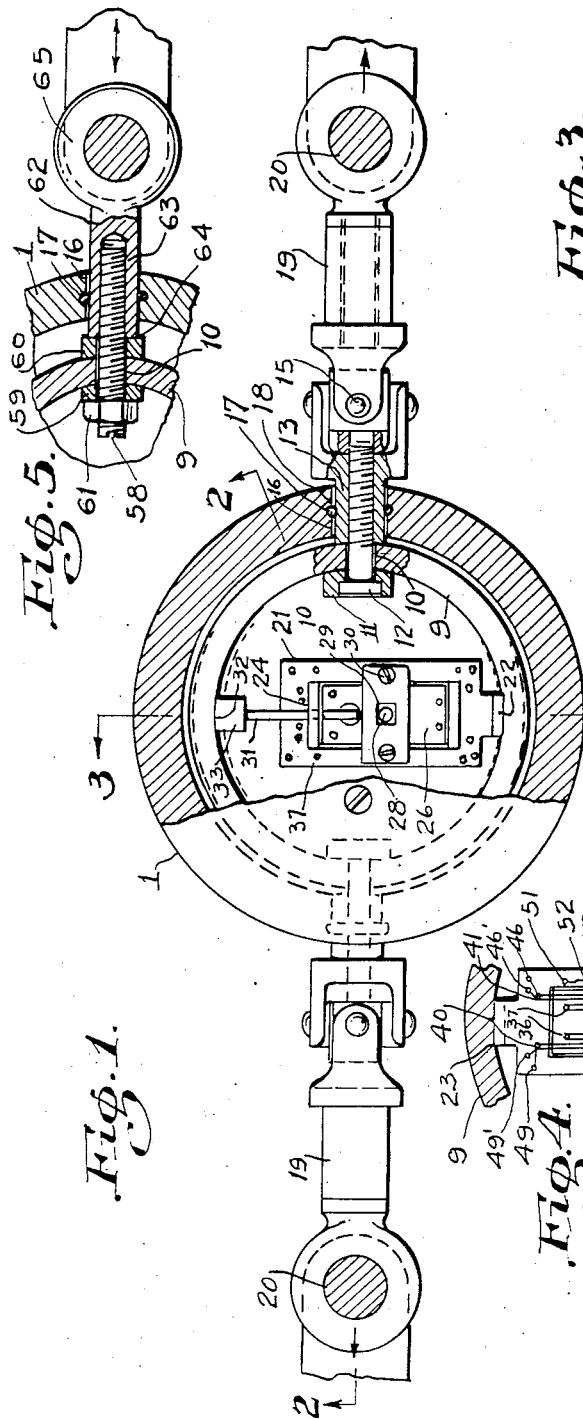
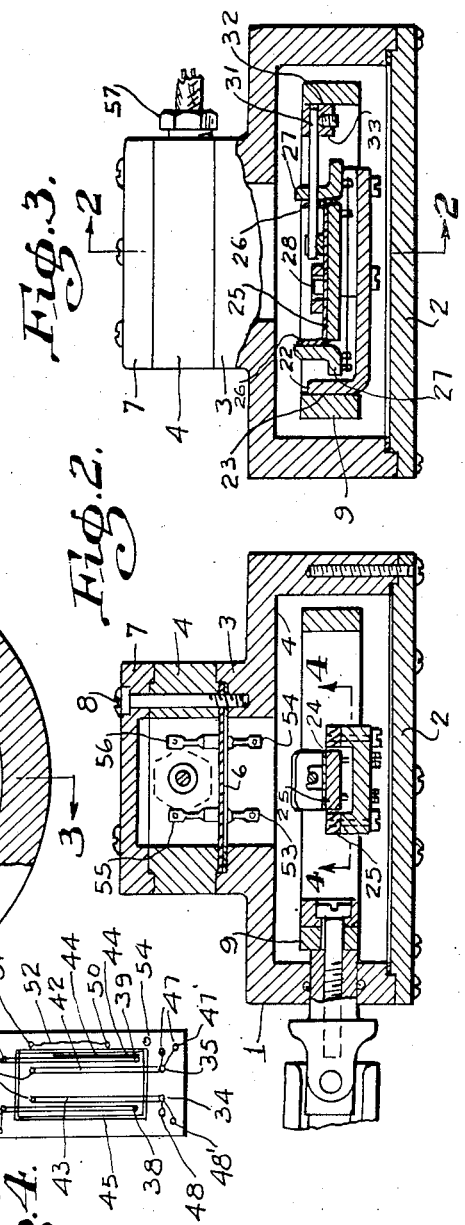
INVENTOR.
Louis D. Statham
BY
ATTORNEY.

Patented Nov. 9, 1948

2,453,551

UNITED STATES PATENT OFFICE 2,453,551

RING TYPE RESISTANCE STRAIN GAUGE DYNAMOMETER

Louis D. Statham, Beverly Hills, Calif., assignor to Statham Laboratories, Inc., Los Angeles, Calif., a corporation of California Application July 31, 1947, Serial No. 765,010

5 Claims. (Cl. 201—63)

This invention relates to a dynamometer useful for the determination of the magnitude of loads imposed in tension or compression as, for instance, in the determination of draw-bar loads.

It is an object of my invention to develop a simple and accurate strain gauge dynamometer which may be employed for the determination of the force exerted at two points at which the strain gauge is connected and which points are subject to separation or approach by the application of a force. In general the dynamometer of my invention consists of a ring which is distorted by the applied load in a direction along one of its diameters. The distortion of the ring is measured as it affects the dimension of the wires of an electrical resistance wire strain gauge mounted so that the wires are placed, with respect to the direction of the applied force, at an angle which may be between 0 and 90° and preferably substantially greater or less than 45°, as, for example, at 0° or 90° to the direction of the force applied to the ring.

These and other objects of my invention will appear from the following description taken together with the drawing, in which Fig. 1 is a plan view with parts broken away in section;

Fig. 2 is a section taken along line 2—2 of Fig. 1;

Fig. 3 is a section taken along line 3—3 of Fig. 1;

Fig. 4 is a section taken along line 4—4 of Fig. 2; and

Fig. 5 is a fragmentary section of a modification of the dynamometer shown in Fig. 1.

Case 1 of the dynamometer is covered by a cover 2 held in position by suitable screws. Case 1 carries a boss 3 upon which is positioned a ring 4 covered by a plate 7. Between the ring 4 and the boss 3 is a terminal plate 6, and the cover plate 7, ring 4, and terminal plate 6 are positioned upon boss 3 by screws 8. Mounted in chamber 4' is a metallic ring 9 specifically illustrated as having a rectangular cross section, but other types may be used. The ring carries two diametrically opposed bores 10. Positioned inside the ring 9 through bores 10 in the wall of the ring are diametrically opposed pull heads 11 having an outer surface of radius such that they conform to the curvature of the ring 9, held in place by means of studs 12 which are screwed into shanks 13 of the universal joints 15. The shanks 13 pass through bores 16 in case 1. Positioned in case 1 and circumferentially of bores 16 are circular channels 17 in which are positioned O rings 18, making a seal with the shanks 13. Connected to the universal joint 15 is a shank 19 which ends in a swiveled eye-bolt 20.

Frame 21 of the strain gauge dynamometer is formed with a bracket 22 which is soldered or otherwise affixed to the ring 9 at 23. For mounting purposes the frame is preferably so positioned that the plane of the dynamometer is parallel to the diameter passing through the studs and the pull heads. Slidably positioned within the rectangular opening 24 of the frame is armature 25. The armature 25 is mounted by means of springs 26 which are soldered to the brackets 27 depending from the frame 21. A pin 28 affixed to the armature moves in a square opening 29 positioned within the stop plate 30 mounted on frame 21. A force transmitting rod 31 is soldered or otherwise affixed to the armature at 32 and attached to the bracket 33 so that the rod is positioned upon a diameter perpendicular to the diameter of the ring passing through the studs 12.

Mounted upon the upper face of the frame 21 are pins 34, 35, 40, and 41. Mounted upon the upper face of the armature 25 are pins 36, 37, 38, and 39. The pins are made of aluminum and anodized. Wound between pins 36 and 34 and between pins 35 and 37 and between pins 39 and 41 and between pins 38 and 40 are four loops of resistance strain wires 42, 43, 44, and 45. These wires may be those commonly used in strain wire gauges, such as an alloy of 55% copper and 45% nickel, and of a diameter of about .001" or even finer gauge. The wires are spaced upon the pins so that they are not in contact with each other, and are therefore insulated from the frame and the armature and each form a continuous elongated and flat loop or coils of wire. The wires of the coils extend in a direction parallel to the axis of pin 34.

Mounted in the frame 21 are four pairs of terminal pins 46, 47, 48, and 49, each comprised of a metallic pin set in a terminal bushing in the frame. Mounted in the frame are additional terminal pins 50 and 51 between which is mounted a balancing wire 52.

In the terminal plate 6 are mounted four terminal pins which are each connected to four electrical conduit lines which pass through the cable outlet.

The wiring gauge is in the form of a Wheatstone bridge whose four legs are the loops with the wire 52 as a balancing resistance. Thus, the ends of the loop 45 are connected to the terminal pins 49 and 49' and the ends of loop 44 are connected to the pins 46 and 46', loop 43 to pins 48 and 48', loop 42 to pins 47 and 47', and the ends of the wire 52 to the terminals 50 and 51. Thus, terminals 48 and 49' are connected to terminals 55; terminals 48' and 46' are connected to 53; terminals 46 and 47 are connected to terminal 54; and terminals 47 to terminal 50; and terminals 51 and 49 are connected to 55.

A gauge so constructed may be mounted by connecting the eyes 20 to two points subject to separation under load, and the force exerted is measured as a variation in resistance of the strain wires on any measuring device operable with the Wheatstone bridge arrangement. This results from the transmission of said force acting to distort the circular nature of the ring 9 to impose a proportional force upon the rod 34 which then moves axially to cause a parallel movement of the armature 25 to cause the said variation in resistance. It will be observed that notwithstanding the direction of the force applied to each of the eyes 20, the resulting distortion of the ring will not impose a bending moment upon the rod 34 or on the frame or armature. The gauge will thus show a faithful linear response to the applied force. Additionally, by positioning the rod upon a diameter perpendicular to the diameter upon which the pull heads are mounted, the maximum movement of the armature and the maximum resistance change are obtained upon the application of any given force to the eyes.

A similar result is obtained by mounting the rod 31 and the accompanying strain wire electrical gauge assembly so that it is disposed axially of the pull heads, i. e., upon the same diameter as upon which the pull heads are mounted. While the rod 31 and the accompanying assembly may be so mounted that the axis of rod 31 is at an angle between 0 and 90° to the pull head axis, the movement of the armature caused by the application of a given force and therefore a given distortion becomes less as the angle approaches 45°, becoming a minimum at about 45° and increasing as the angle approaches 0 or 90°.

While I have described the dynamometer as applied to the measurement of tension, it may also be employed with suitable modification to measurement of compression. For such purpose I employ a push head shown in Fig. 5 in place of the pull head and universal joint assembly of Fig. 1. The stud 58 passes through the bore 10 in the ring 9. Washers 60, having faces curved with the radius of curvature of the ring so that they fit the rings shown in Fig. 5, are clamped between the nut 61 and the end 64 of the shank 63. The shank 63 is mounted similarly to the mounting of the shank 13 in the bore 17 and similarly seated by the ring 17. The stud 58 is screwed into the shank as shown. An eye 65 may be positioned at the end of 62 to be connected to the load applying means. As will be understood, a force transmitting linkage like that shown in Fig. 5 is positioned on the opposite end of the ring diameter in the manner shown in Fig. 1. By this means the compressive force may be transmitted to the ring to cause distortion affecting the electrical strain wire gauge in a manner which will be clear from what has been said above.

While I have described a particular embodiment of my invention for the purpose of illustration, it should be understood that various modifications and adaptations thereof may be made within the spirit of the invention as set forth in the appended claims.

I claim:

1. A ring type electrical resistance strain wire dynamometer, comprising a metallic ring, a pair of force transmitting heads mounted on said ring upon a diameter of said ring, a frame mounted on said ring, a reciprocable armature mounted in said frame, a rod connected to said ring and to said armature, the axis of said rod being perpendicular to the aforementioned diameter, an electrical resistance strain wire support mounted on said frame, an electrical resistance strain wire support mounted on said armature, an electrical resistance strain wire mechanically mounted on said support and insulated therefrom, and electrical conduits connected to the ends of said strain wire.

2. A ring type electrical resistance strain wire dynamometer, comprising a metallic ring, a pair of force transmitting heads mounted on said ring upon a diameter of said ring, a frame mounted on said ring, a reciprocable armature mounted in said frame, a rod connected to said ring and to said armature, the axis of said rod being at an angle substantially different from 45° to the aforementioned diameter, an electrical resistance strain wire support mounted on said frame, an electrical resistance strain wire support mounted on said armature, an electrical resistance strain wire mechanically mounted on said support and insulated therefrom, and electrical conduits connected to the ends of said strain wire.

3. A ring type electrical resistance strain wire dynamometer, comprising a metallic ring, a pair of force transmitting heads mounted on said ring upon a diameter of said ring, a frame mounted on said ring, a reciprocable armature mounted in said frame, a rod connected to said ring and to said armature, the axis of said rod being perpendicular to the aforementioned diameter, an electrical resistance strain wire support mounted on said frame, an electrical resistance strain wire support mounted on said armature, an electrical resistance strain wire mechanically mounted on said support and insulated therefrom and extending in a direction parallel to the axis of said rod, and electrical conduits connected to the ends of said strain wire.

4. A ring type electrical resistance wire dynamometer, a metallic ring, a pair of diametrically disposed bores in the wall of said ring, pull heads mounted in said bores, said pull heads including a shank passing through said bores, a universal joint on said shank, the axis of said shank being positioned upon a diameter of said ring, a frame mounted on said ring, an armature reciprocably mounted in said frame, a rod connected to said armature and said ring, the axis of said rod being perpendicular to said diameter, a plurality of coils of electrical strain wires, supports upon said armature and said frame for said coils, the wires of said coils being insulated from said supports and extending in a direction substantially parallel to the axis of said rod, and electrical terminals connected to said coils.

5. A ring type electrical resistance wire dynamometer, a metallic ring, a pair of diametrically disposed bores in the wall of said ring, pull heads mounted in said bores, said pull heads including a shank passing through said bores, a universal joint on said shank, the axis of said shank being positioned upon a diameter of said ring, a frame mounted on said ring, an armature reciprocably mounted in said frame, a rod connected to said armature and said ring, the axis of said rod being at an angle substantially different from 45° to said diameter, a plurality of coils of electrical strain wires, supports upon said armature and said frame for said coils, the wires of said coils being insulated from said supports and extending in a direction substantially parallel to the axis of said rod, and electrical terminals connected to said coils.

LOUIS D. STATHAM.

No references cited.